United States Patent [19]
Olsson et al.

[11] Patent Number: 5,429,414
[45] Date of Patent: Jul. 4, 1995

[54] RELATING TO A CHILD SEAT

[75] Inventors: Joakim Olsson, Hyssna; Lennart Eksell, Vargarda, both of Sweden

[73] Assignee: Autoliv Development AB, Vargarda, Sweden

[21] Appl. No.: 110,825

[22] Filed: Aug. 24, 1993

[30] Foreign Application Priority Data

Sep. 9, 1992 [GB] United Kingdom ............... 9219081

[51] Int. Cl.⁶ .................................................. B60N 1/12
[52] U.S. Cl. ........................................... 297/238; 297/14
[58] Field of Search .................................... 297/238, 14

[56] References Cited

U.S. PATENT DOCUMENTS

| | | | |
|---|---|---|---|
| 4,580,832 | 4/1986 | Maruyama et al. | 297/14 |
| 4,722,568 | 2/1988 | Irvin | 297/238 |
| 4,902,069 | 2/1990 | Lehnert | 297/14 |
| 4,986,600 | 1/1991 | Leblanc et al. | 297/238 |
| 5,026,118 | 6/1991 | Vander Stel et al. | 297/238 |
| 5,100,199 | 3/1992 | Vander Stel et al. | 297/238 |
| 5,224,756 | 7/1993 | Dukatz et al. | 297/238 |

FOREIGN PATENT DOCUMENTS

| | | |
|---|---|---|
| 2023415 | 1/1980 | United Kingdom . |
| 2232582 | 12/1990 | United Kingdom . |
| 2243076 | 10/1991 | United Kingdom . |

*Primary Examiner*—John T. Kwon
*Attorney, Agent, or Firm*—Spencer, Frank & Schneider

[57] ABSTRACT

A seat for a vehicle comprising a main or "adult" seat incorporating an integrated child seat, the main or "adult" seat comprising a back and a squab, and the child seat having a squab which, in an initial condition, is present in a recess formed in the back of the adult seat in a substantially upright position, the squab of the child seat being movable to a second position in which the squab of the child seat is substantially horizontal, the position of the squab of the child seat, when in the said substantially horizontal position, being adjustable relative to the squab of the "adult" seat, the "adult" seat being provided with a safety belt which includes at least a shoulder strap to be used both for an occupant of the adult seat and for an occupant of the child seat.

21 Claims, 5 Drawing Sheets

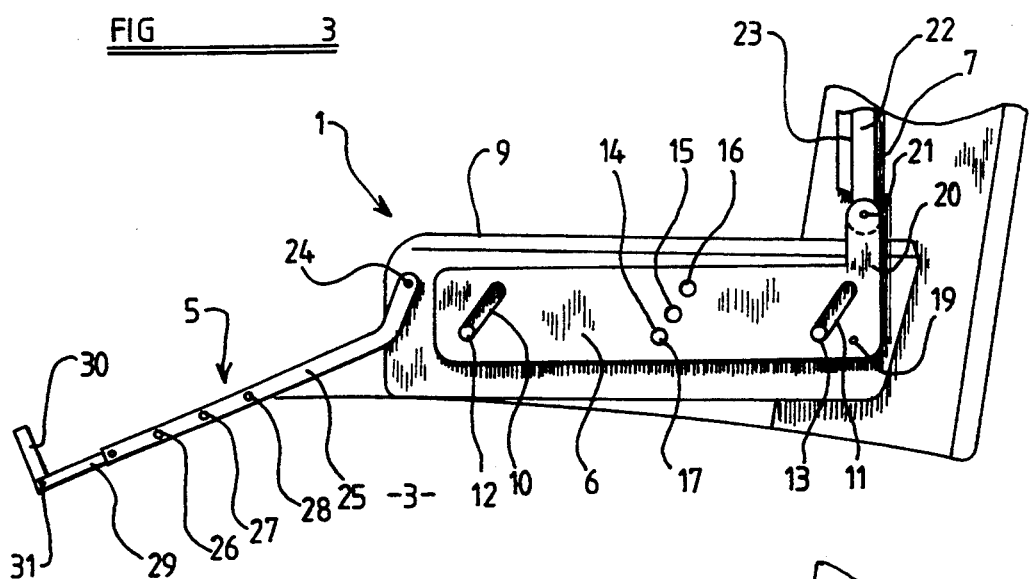
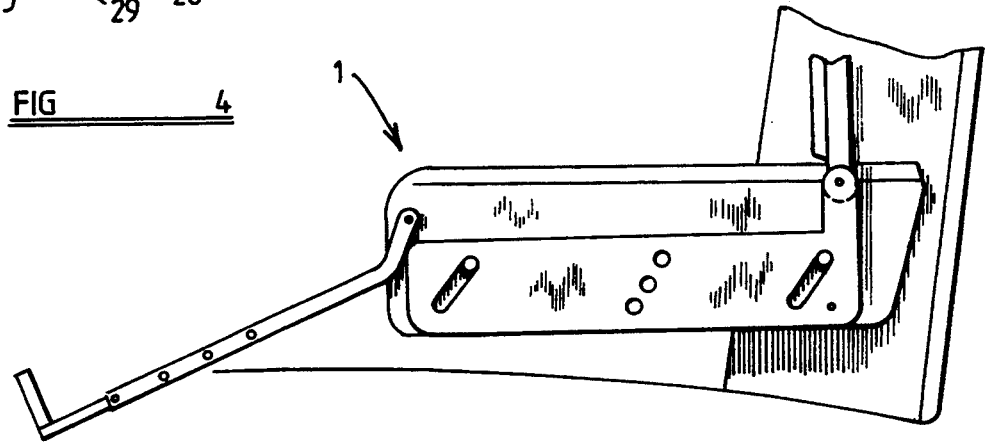
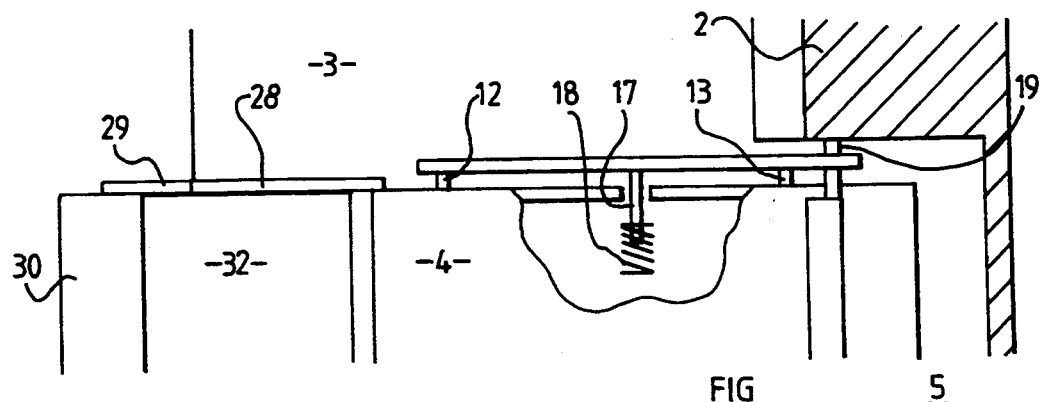

FIG 8
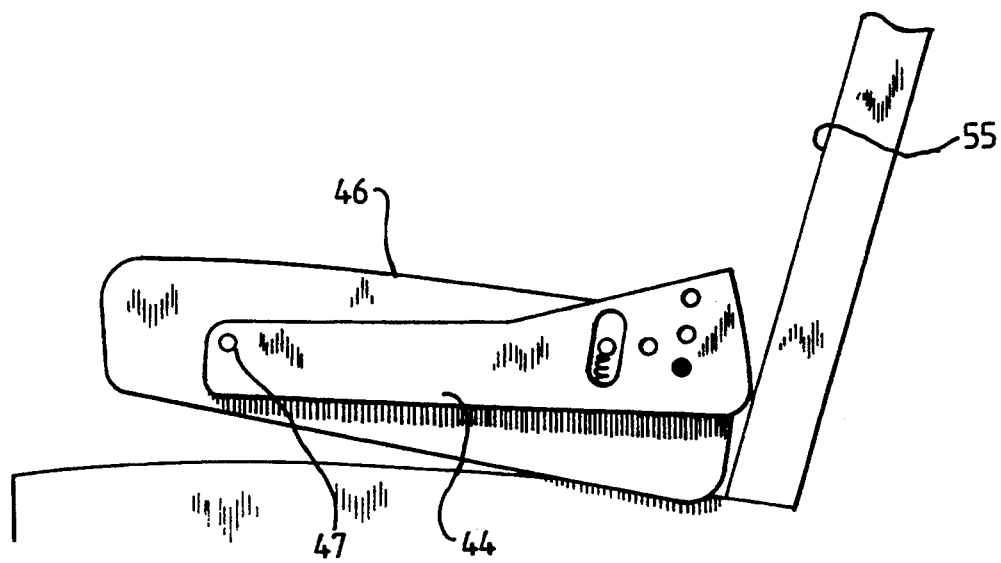
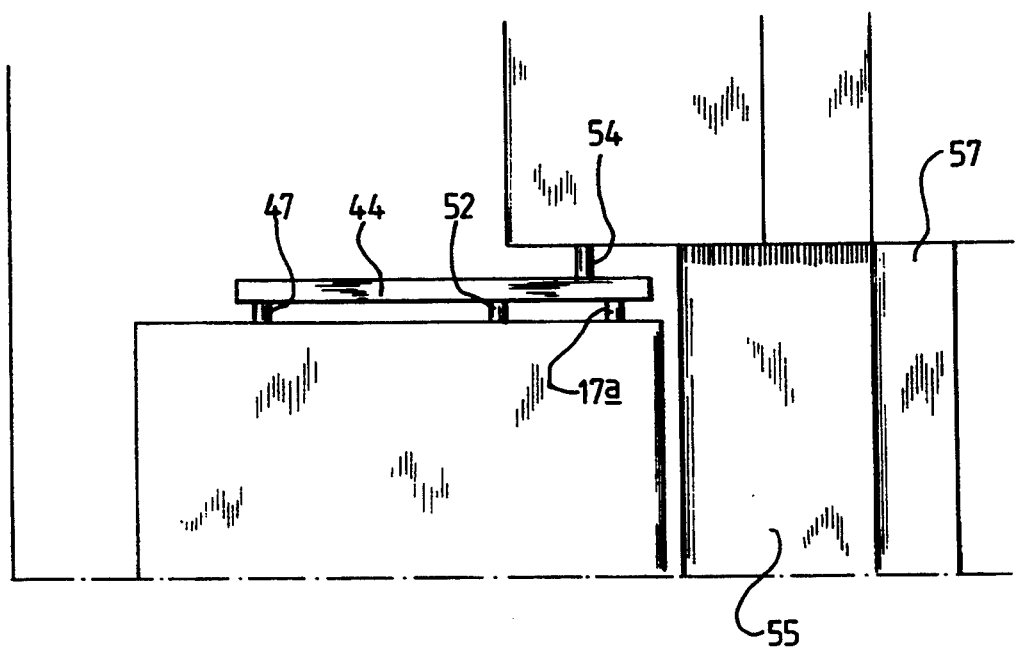
FIG 9

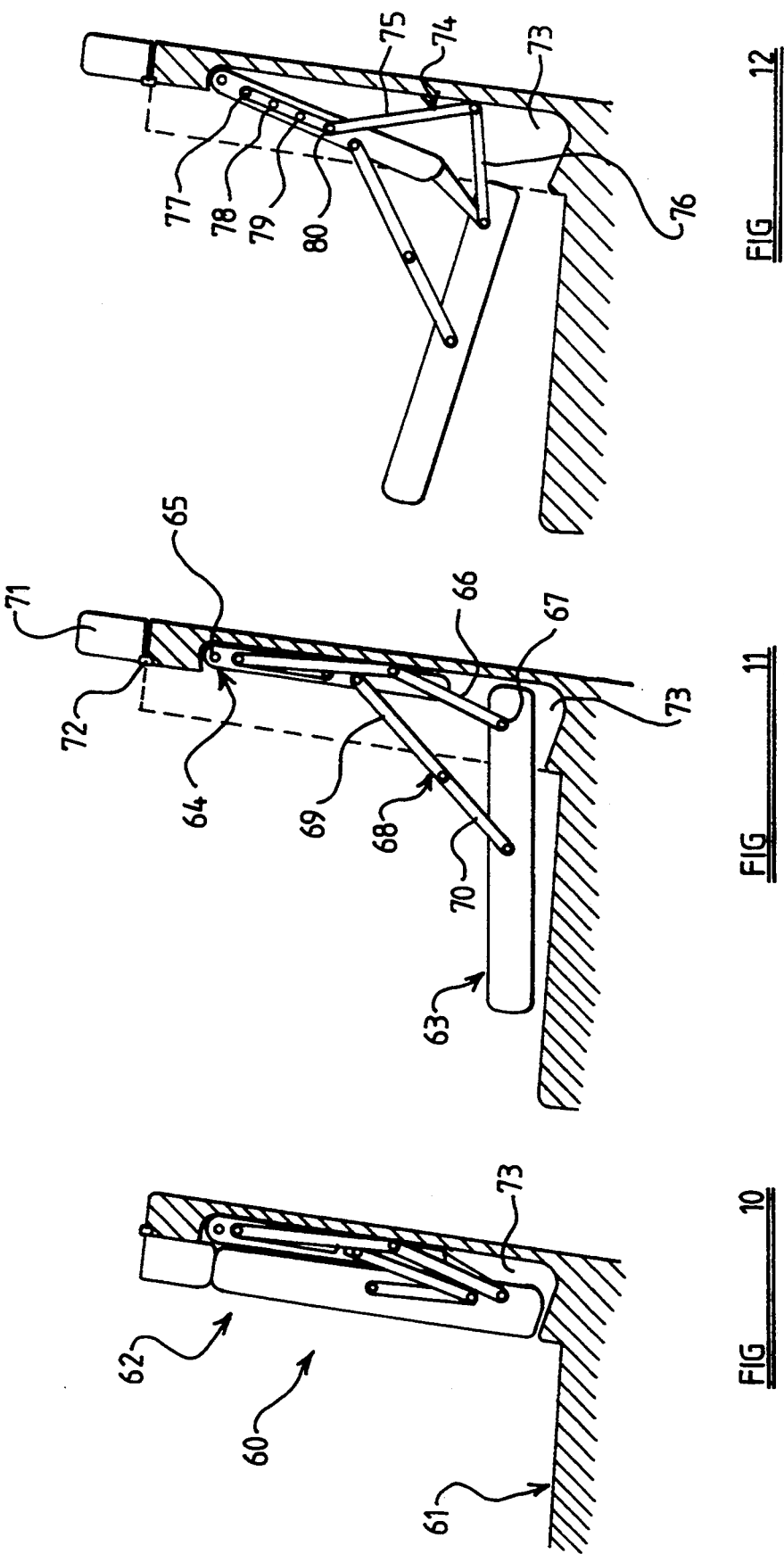

RELATING TO A CHILD SEAT

BACKGROUND OF THE INVENTION

THE PRESENT INVENTION relates to a child seat and more particularly relates to a child seat integrated into an ordinary or "adult" seat in a motor vehicle.

SUMMARY OF THE INVENTION

According to this invention there is provided a seat for a vehicle comprising a main or "adult" seat incorporating an integrated child seat, the main or "adult" seat comprising a back and a squab, and the child seat having a squab which, in an initial condition, is present in a recess formed in the back of the adult seat in a substantially upright position, the squab of the child seat being movable to a second position in which the squab of the child seat is substantially horizontal, the position of the squab of the child seat, when in the said substantially horizontal position, being adjustable relative to the squab of the "adult" seat, the "adult" seat being provided with a safety belt which includes at least a shoulder strap to be used both for an occupant of the adult seat and for an occupant of the child seat.

Preferably the child seat is provided with a foot rest.

Advantageously the foot rest comprises elements which can be moved between a retracted position and an operative position.

Conveniently when the foot rest is in the retracted position the foot rest lies adjacent the upper-surface of the squab of the child seat.

Conveniently the foot rest is telescopic and thus of adjustable length.

Conveniently the foot rest is provided with two side arms which support between them a pivotally mounted foot support member.

Preferably the foot rest comprises two side arms, an element extending between the side arms to protect the squab of the adult seat when the child seat is in the operative position.

Preferably the squab of a child seat is supported by two support arms, the support arms being mounted for movement between a position in which they support the squab of a child seat in a substantially vertical position retracted within the back of the adult seat, and a substantially horizontal operative position.

Advantageously the under-surface of the squab of the child seat is padded or cushioned, the under-surface of the squab of the child seat defining part of the back of the adult seat when the child seat is in the retracted position.

Preferably the support arms are pivotally connected to the back of the adult seat.

Conveniently the position of the squab of the child seat is adjustable relative to the said support arms.

Advantageously means are provided to retain the child seat in a selected one of a plurality of possible positions relative to the support arms.

Conveniently the retaining means comprise a locking pin mounted in the squab of the child seat adapted to engage a selected locking aperture provided in the support arm.

Preferably the locking pin is biassed into engagement with the aperture and means are provided for withdrawing the locking pin from the aperture against the bias.

Advantageously guide pins are provided projecting from the squab of the child seat, the guide pins being received in elongate apertures provided in the support arms in order to guide movement of the squab of the child seat relative to the support arms.

Conveniently the squab of the child seat is pivotally connected to the support arm and can move pivotally relative to the support arm against a spring bias.

Preferably the child seat is provided with a back, the back being formed by an element which is pivotally connected to the support arms.

Alternatively the child seat may be provided with a back, the back being formed by an element which is pivotally connected to the back of the adult seat.

In this case the element forming the back of the child seat may be pivotally connected to the back of the adult seat adjacent an upper end of the back of the child seat. The squab of the child seat may be adjustable relative to the squab of the adult seat by pivoting the complete child seat about the pivot connection between the back of the child seat and the back of the adult seat, this pivotal movement of the child seat enabling the child seat to be set to a reclined position.

Preferably means are provided to retain the child seat in a selected one of a plurality of possible positions relative to the adult seat.

Conveniently the retaining means comprise a two-bar linkage inter-connecting the back and the squab of the child seat, part of the linkage engaging the back of the adult seat in order to "prop" the child seat in the reclined position.

Alternatively the retaining means further comprise a locking pin mounted on one bar of the linkage, the pin being adapted to engage one of a plurality of apertures provided at different settings in the back of the child seat.

The back of the child seat may, in another alternative be formed by the back of a recess which accommodates the squab of a child seat when the squab of a child seat is in the retracted position.

BRIEF DESCRIPTION OF THE DRAWINGS

In order that the invention may be more readily understood, and so that further features thereof may be appreciated, the invention will now be described, by way of example, with reference to the accompanying drawings in which FIG. 3 illustrates a child seat in a fully erected condition, FIG. 4 corresponds to FIG. 3 but shows the seat in an adjusted position, FIG. 5 is a top plan view of the seat in the condition of FIG. 4, FIG. 8 illustrates the child seat of FIGS. 6 and 7 in an adjusted position, FIG. 9 is a top plan view of the child seat of FIG. 8, FIG. 10 is a side view of a further alternative embodiment of a child seat showing the seat in a retracted position within an adult seat in a motor vehicle, FIG. 11 shows the seat of FIG. 10 when in an erected or operative position, and FIG. 12 shows the seat of FIGS. 10 and 11 when in the operative position, but in an adjusted setting.

DETAILED DESCRIPTION OF THE PREFERRED EMBODIMENTS

Figure 1:
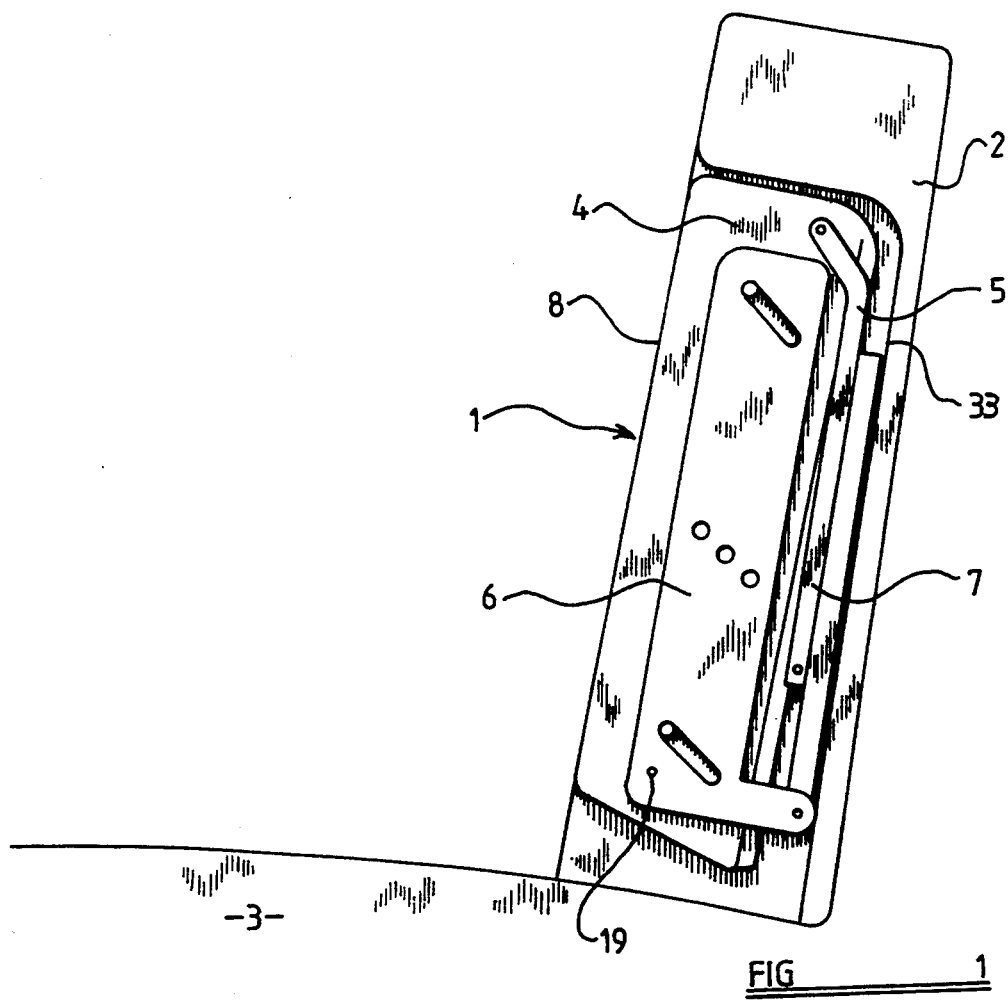
FIG. 1 is a side view of an adult seat in a motor vehicle with parts thereof cut away for the sake of clarity of illustration, the figure illustrating the squab and backrest of an adult seat and the components of a child seat in a retracted position.
Figure 2:
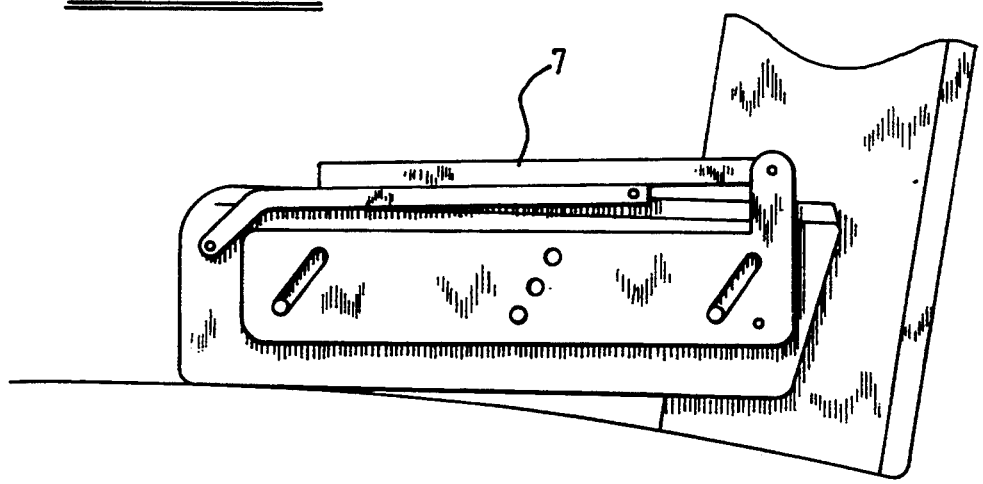
FIG. 2 is a view corresponding to FIG. 1 showing the child seat in a partly erected condition.

Referring initially to FIGS. 1 to 5 a child seat 1 is so formed that the components of the child seat may move from an initial retracted condition, illustrated in FIG. 1, in which the components of the child seat 1 are effectively contained within the back 2 of an adult seat in a motor vehicle having a squab 3 to a fully extended position, as illustrated in FIGS. 3 and 4. Thus as will be described the child seat 1 is such that it is provided with a squab 4 which is adjustable in height, relative to the squab 3 of the adult seat, so that the child seat can be positioned so that the safety belt provided primarily for use by an adult in the adult seat will be correctly positioned to retain a child in the child seat. The child seat 1 is also provided with a foot rest 5 which provides a degree of comfort for a child in the child seat and also provides a degree of protection for the squab 3 of the adult seat.

Referring to the drawings in greater detail, the child seat comprises a squab 4 to which is connected the foot rest 5. The squab is supported by two support arms 6 located on each side of the squab, only one of which is shown. The support arms also support a back 7 for the child seat.

The squab 4 is provided with a padded or upholstered under-surface 8 and a padded or upholstered over-surface 9. The two opposed side edges of the squab 4 are each associated with a respective support arm 6. Each support arm 6 is provided with two elongate apertures 10,11 inclined at an acute angle to the plane substantially defined by the padded under and over-surfaces 8,9 of the squab. The squab is provided with projecting pins 12,13 which are respectively received within the elongate apertures 10,11. The support arm 6 is also provided with a plurality of apertures 14,15,16. One of the apertures 14, is shown receiving a locking pin 17. The locking pin 17 is adapted to be retracted from the aperture 14, thus permitting the squab 4 of the child seat to slide relative to the support arm 6 with a movement of the pins 12 and 13 along the elongate slots 10 and 11. The pin 17 is spring biassed by means of a spring 18 into the locking position, and a mechanism may be provided for withdrawing the pin, against the spring bias, out of the locking condition. This mechanism may be controlled by an appropriately located knob connected to the locking pin 17 by a Bowden cable or some other appropriate mechanism.

The support arm 6 is itself mounted for pivoting movement about a pivot axis 19.

The support arm 6 is provided with a projecting lug 20 which pivotally supports the back rest 7 by means of a pivot connection 21. The back rest comprises a rear support 22 and a padded front 23. The rear support and the padded front are connected to the pivotal connection 21 by two downwardly projecting arms which extend down beyond the lower edge of the rear support 22 and the associated padded front 23.

The foot rest 5 is pivotally connected to the squab by a pivot connection 24, and comprises two side arms 25, each of which is hollow and is provided with apertures aligned axially of the arm 26,27,28. The arm 25 receives telescopically a foot rest support element 29, the foot rest support element 29 carrying a spring-biassed pin adapted selectively to engage with one of the apertures 26,27,28. The support element 29 supports a pivotally mounted foot engaging plate 30 using of a pivotal connection 31.

The embodiment has been described with reference to side views taken from one side. It is to be noted that the other side of the child seat will correspond, with the illustrated components being duplicated, as appropriate.

FIG. 5 illustrates the seat from above when in the condition illustrated in FIG. 4. It can be seen that an appropriate protecting element 32 formed of plastic, metal or fabric, extends between the arms 28 and the support element 29.

It is to be appreciated that in an initial, retracted condition all the components of the child seat 1 are effectively received within a recess 23 provided for that purpose in the back 2 of the adult seat. The padded under-surface 8 of the squab 4 of the child seat effectively forms a closure for the recess 33 and forms part of the operative back 2 of the adult seat 3. The adult seat 3 will be provided with a conventional seat belt.

It is to be observed that in the condition of FIG. 1 the plane defined by the opposed under and over-surfaces of the squab 4 of the child seat is substantially vertical, and the foot rest lies adjacent the upper surface 9 of the squab 4 of the child seat, whilst the back 7 of the child seat lies adjacent the foot rest.

In order to render the child seat operative, initially the entire assembly is pivoted about the pivot axis 19, so that the squab 4 of the child seat is then substantially horizontal. The back 7 of the child seat is then pivoted about the pivot axis 21 to a substantially upright condition. An appropriate catch may be provided adjacent the top of the recess 33 to engage co-operating means provided on the back 7 of the child seat.

The foot rest 5 of the child seat is then moved about the pivot axis 24 until the support arms 25 are in the position illustrated in FIG. 3. The foot engaging member 30 is pivoted about the pivot axis 31 to the operative condition illustrated in FIG. 3.

Depending upon the size of the child to use the child seat, various adjustments may then be made to the child seat. Initially, the height of the squab 4 of the child seat above the squab 3 of the adult seat may be adjusted. This is accomplished by retracting the locking pin 17 from the aperture (one of the apertures 14,15,16 in the support arm 6) initially engaged by the pin, and then moving the squab of the seat so that the pins 12 and 13 move along the inclined elongate slots 10 and 11. Thus the height of the squab 4 of the child seat above the squab 3 of the adult seat may be adjusted. When the squab of the child seat is in an appropriate position the pin 17 is released to re-engage an appropriate aperture 14,15 or 16. FIGS. 3 and 4 illustrate the squab 4 of the child seat into extreme positions of adjustment. It is to be noted that in FIG. 4 part of the squab of the child seat extends between the two arms extending from the main portion of the back rest 7 and the pivotal connection 21 to the extensions 20 of the support arm 6. When the height of the squab 4 is adjusted, the effective length of the squab (as measured front-to-back) will also be adjusted at the same time due to the inclination of the elongate apertures 10,11.

A further adjustment that may be made relates to the effective length of the foot rest.

It is to be appreciated that the adjustment of the height of the squab 4 of the child seat will be made primarily to ensure that when a child is sitting on the squab 4 of the child seat the belt provided with the adult seat will pass across that child in a correct position. The adjustment of the length of the foot rest 5 depends, of course, upon the length of the legs of the child.

It is to be appreciated that the provision of the foot rest 5 prevents the legs of the child resting on the edge of the squab 3 of the adult seat. This means that the child will be more comfortable than if the foot rest were omitted. Also, the protecting element 32 of the foot rest provides some degree of protection for the squab 3 of the adult seat, since if the foot rest and the protecting element were not present the squab 3 of the adult seat might be scuffed or otherwise damaged by the shoes of a child sitting on the child seat and, if those shoes were dirty or soiled, then the squab 3 of the adult seat would become dirty or soiled.

It is to be appreciated that, when the child seat of FIGS. 1 to 5 is no longer to be used, the child seat may be returned to the initial position simply by reversing the procedure used to erect the child seat.

FIGS. 6 to 9 illustrate an alternative embodiment of the invention. In this embodiment a child seat 40 is provided which has an initial retracted position within the back 41 of an adult seat which has a squab 42. The child seat comprises a squab 43 of generally rectangular form mounted on two support arms located on either side of the squab, only one of which, 44 is shown.

The squab 43 of the child seat has a padded or upholstered under-surface 45 and a padded or upholstered upper-surface 46. The squab 43 is pivotally connected to the support arm 44 by means of a pivot axis 47 located towards the upper edge of the seat squab when it is in the initial retracted position or the forward edge of the seat squab when it is in the operative condition. At the other end of the support arm a plurality of apertures 48,49,50 are provided adapted to receive a spring-biassed locking element 17a which may be similar to the spring-biassed locking pin 17 of FIG. 5. An elongate aperture 51 is also provided which receives a pin 52 projecting from the squab 43 of the child seat, the pin 52 being associated with a spring, such as spring 53 which provides a predetermined bias to the pin 52. Each support arm 44 is pivotally mounted to the back of the adult seat about a pivot axis 54.

Figure 6:
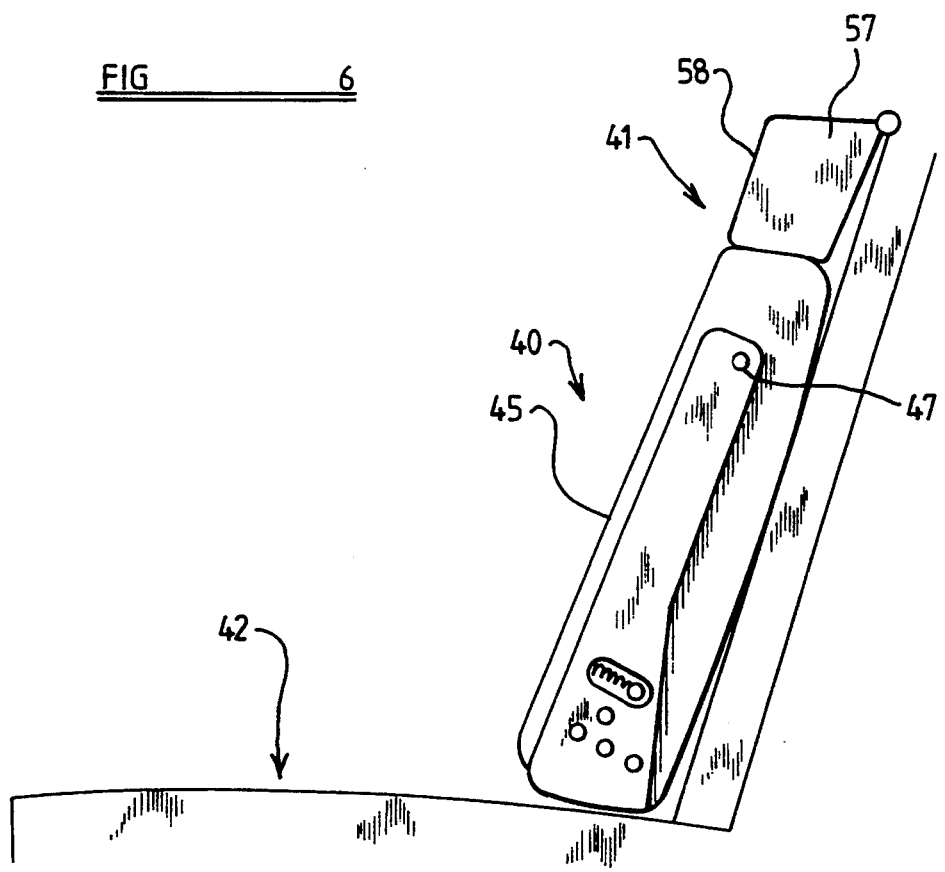
FIG. 6 is a side view of an alternative embodiment of the seat, illustrating the child seat in a retracted position.

The back of the child seat is formed by a substantially rigid element 55 provided with padding and/or upholstering which effectively forms the rear part of a recess adapted to receive the child seat when it is in the retracted position as illustrated in FIG. 6.

Figure 7:
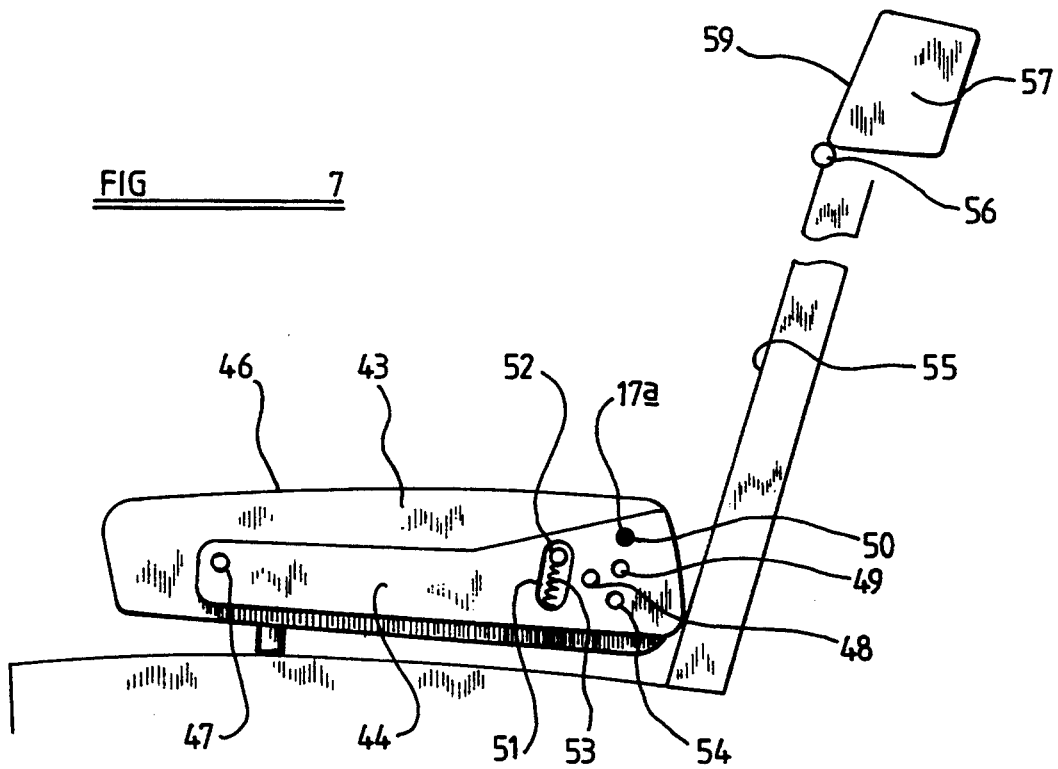
FIG. 7 illustrates the child seat of FIG. 6 in an erected condition.

Pivotally mounted, by means of a pivot 56, to the top of the element 55, is a padded element 57 which can be moved between two positions as illustrated in FIGS. 6 and 7. In the position illustrated in FIG. 6, in which the squab of the child seat is substantially vertical, a forward face 58 of the element 47 is aligned with the padded under-surface 45 of the squab 43 of the child seat, the under-surface of the squab of the child seat and the element 57 combining to form the back of the "adult" seat. The element 57 may also be moved to the position illustrated in FIG. 7 in which an under-surface 59 is substantially aligned with the padded part 55 of the element 54 forming the back rest of the child seat, so that the element 57 forms an extension of that back rest for the child seat.

The seat initially occupies the retracted position illustrated in FIG. 6, in which the child seat is not operational, and an adult may use the seat. When the child seat is to be operational initially the element 57 is moved about the pivot axis 56 to the elevated position shown in FIG. 7. Subsequently the support arms 44 are moved about the pivot axis 54 so that the squab of the child seat is substantially horizontal at a position above the squab 42 of the adult seat. A child may then be placed upon the child seat. If the locking pin 17a is then retracted from the apertures 48, 49 and 50 the weight of the child sitting on the squab 43 of the child seat will tend to pivot the squab of the child seat in a clockwise direction (as shown in FIGS. 6 to 8) about the pivot axis 47 against the bias of the spring 53. The distance of pivotal movement of the squab of a child seat would depend upon the weight of the child. The locking pin 17a may then be released when it will re-engage an appropriate aperture 48, 49 or 50. FIG. 8 illustrates the seat squab in a condition that it will occupy if a heavy child is sitting on the squab.

It is to be appreciated that the arrangement illustrated in FIGS. 6 to 9 is such that when a child is placed on the child seat, the height of the squab is adjusted automatically, thus ensuring that the seat belt provided for the adult seat will engage the child in a correct manner.

It is to be appreciated that whilst in the embodiment illustrated in FIGS. 6 to 9 a locking pin adapted to cooperate with apertures 48 to 50 is provided to lock the squab of the child seat in the desired position once automatic adjustment has been effected, many other arrangements may be utilised to lock and retain the squab of the child seat in an appropriate position. However, it is preferred that some mechanism is provided which can be used to release the locking mechanism when a child is initially placed on the squab of the child seat, thus permitting the position of the squab of the child seat to be adjusted automatically, the locking mechanism then again becoming operative.

It is to be appreciated that the seat illustrated in FIGS. 6 to 9 may be provided with a foot rest directly equivalent to the foot rest of the embodiment of FIGS. 1 to 5.

Referring now to FIGS. 10, 11 and 12 a further alternative arrangement of a child seat 60 is shown, the child seat again being mounted upon an adult seat having a squab 61 and a back 62 so as to form part of the back 62 of the adult seat when not in use. The child seat is therefore mounted in the back of the adult seat and is movable between a retracted position, shown in FIG. 10, and an extended or operative position as shown in FIG. 11.

The child seat 60 comprises a squab 63 and a back 64. Both the upper surface and the under-side of the squab 63 are padded. The outwardly directed front surface of the back 64 of the child seat is, of course, also padded.

The upper-most end of the back 64 of the child seat is pivotally connected to the back 62 of the adult seat by means of a pivot pin 65 or the like. It will of course be appreciated that in the accompanying drawings the child seat is illustrated from one side only and there would, of course, be pivot pins 65 on either side of the back 64 of the child seat or a single pivot pin 65 which extends over the full width of the back 64 of the child seat to project from both sides thereof. The squab 63 of the child seat is connected to the lower end of an extension 66 at the lower end of the back 64 of the child seat by way of a pivotal connection 67. Thus, the squab 63 of the child seat may be raised and lowered relative to the back 64 by pivoting the squab 63 about the axis of the pivotal connections 67.

Two support arms 68 (only one of which is visible in the drawings) extend between approximately mid points on the back and squab of the child seat on opposite sides thereof. The support arms 68 each comprise two pivotally inter-connected links 69,70 which serve to limit downwards movement of the squab 63 when it is lowered relative to the back 64 by pivoting it about the axis of the pivot connection 67. When the support arms 68 are fully extended so as to extend in a straight line between the mounting points for the links 69,70 on the back and squab of the child seat respectively, the squab 63 is approximately at right angles to the back 64, with this position defining the operative setting of the child seat.

A padded element 71 is mounted on the back of the adult seat by means of a pivotal connection 72 at a position just above the level of the child seat 60. The element 71 is padded on its front and rear surfaces. The element 71 is movable between a lowered position, as shown in FIG. 10, in which it forms part of the back 62 of the adult seat just above the squab 63 of the child seat when the squab is in the retracted position and a raised position, as shown in FIG. 11, in which the element 71 forms an extension to the height of the back of the child seat.

It will of course be appreciated that the child seat is, when not in use, accommodated within a recess 73 formed in the back of the adult seat in a motor vehicle. When the child seat is to be used the padded element 71 may be pivoted upwardly about the pivot connection 72 and then the squab 63 of the child seat may be pivoted downwardly about the pivot connection 67 until the support arms 68 are fully extended and the child seat is in the position shown in FIG. 11 when it is ready for use by a child.

In order to provide for adjustment of the setting of the squab 63 of the child seat to allow a child using the seat safely to wear an adult seat belt or to make the child seat more comfortable for a child who may wish to go to sleep, the seat is additionally provided with a linkage 74 comprising two bars 75,76, the linkage inter-connecting an upper region of the back 64 of the child seat and a rear-most region of the squab 63 of the child seat. Thus, the bar 75 is pivotally connected to an upper region of the back of the child seat whilst the bar 76 is pivotally connected to the pivot connection 67 adjacent the rear of the squab of the child seat. The bars 75,76 are, of course, pivotally interconnected with each other. The connection of the bar 75 to the upper region of the back of the child seat is an adjustable connection, with the back of the child seat defining a plurality of settings 77,78,79,80 to which the upper end of the bar 75 may be releasably connected. The settings 77,78,79,80 are spaced apart over the height of the back of the child seat in an upper region thereof, that is to say above the point at which the upper link of the support arm 68 connects with the back 64 of the child seat.

The two bar linkage 76 permits the child seat 60 to be adjusted so that the squab of the child seat is raised from the position shown in FIG. 11 and also so that the entire child seat may be angled rearwardly or reclined in order to make the seat more comfortable for a child wishing to go to sleep.

FIG. 11 illustrates the child safety seat in the operative position when the upper bar 75 of the linkage 76 is connected to the upper-most setting 77 in the back of the child seat. In this position the child seat 60 is in its lower-most operative condition. FIG. 12 illustrates the child seat when the upper bar 75 of the linkage 76 is connected to the lower-most setting 80 in the back 64 of the child seat and, as can clearly be seen from the accompanying drawing, the child seat has been pivoted about the pivot connection 65 so that it is now in a raised and reclined position. The child seat may, of course, be set to one of the other settings between the two settings illustrated in FIGS. 11 and 12. The releasable connection between the upper end of the bar 75 and the various settings in the upper region of the back of the child seat may comprise a very simple arrangement such as a spring biassed pin mounted on the upper-most end of the bar 75 and a plurality of holes in an element mounted on the side of the back of the child seat with the spring biassed pin being manually retractable from one hole to permit raising or lowering of the complete child seat about the pivot connection 65 before the pin is released so as to engage within another hole at a different setting. The pivotal connection between the bars 75,76 engages the outwardly directed surface of the recess 73 in the adult seat and acts to "prop" the child seat in the desired setting.

It is again to be appreciated that the seat illustrated in FIGS. 10, 11 and 12 may be provided with a foot-rest equivalent to that shown in the embodiment of FIGS. 1 to 5.

We claim:
1. A seat for a vehicle, comprising:
 (A) an adult seat having:
  (1) a back having a recess formed therein;
  (2) a squab; and
  (3) a safety belt including a shoulder strap; and
 (B) a child seat integrated into the adult seat having:
  (1) a back;
  (2) connecting means for pivotally connecting an upper portion of the back of the child seat to an adjacent portion of the adult seat back;
  (3) a squab locatable within the back recess in a substantially upright position and movable from the back recess into a substantially horizontal position, the child seat squab being adjustable relative to the adult seat squab when the child seat squab is in the horizontal position by pivoting the entire child seat around the connecting means so that the child seat is positionable into a reclined position; and
  (4) stop means for limiting a maximum angle of about ninety degrees between the child seat squab and the child seat back so that an angle between the back and the squab of the child seat is kept constant when the child seat is moved to the reclined position; whereby the safety belt is usable by both an occupant of the adult seat and an occupant of the child seat.

2. A seat for a vehicle according to claim 1 in which the child seat is provided with a foot rest.

3. A seat according to claim 2 wherein the foot rest comprises elements which can be moved between a retracted position and an operative position.

4. A seat according to claim 3 wherein when the foot rest is in the retracted position the foot rest lies adjacent an upper-surface of the squab of the child seat.

5. A seat according to claim 2 wherein the foot-rest is telescopic and of adjustable length.

6. A seat according to claim 2 wherein the foot rest is provided with two side arms which support between them a pivotally mounted foot support member.

7. A seat according to claim 2 wherein the foot rest comprises two side arms, and an element extending between the side arms to protect the squab of the adult seat when the child seat is in an operative position.

8. A seat according to claim 1 in which the squab of the child seat is supported by two support arms, the support arms being mounted for movement between a position in which they support the squab of the child seat in a substantially vertical position retracted within the back of the adult seat, and a substantially horizontal operative position.

9. A seat according to claim 7 wherein the under-surface of an squab of the child seat is padded, the under-surface of the squab of the child seat defining part of the back of the adult seat when the child seat is in the retracted position.

10. A seat according to claim 8 wherein the support arms are pivotally connected to the back of the adult seat.

11. A seat according to claim 8 in which the position of the squab of the child seat is adjustable relative to the support arms.

12. A seat according to claim 11 wherein means are provided for retaining the child seat in a selected one of a plurality of possible relative positions relative to the support arms.

13. A seat according to claim 12 wherein said retaining means comprise a locking pin mounted in the squab of the child seat adapted to engage a selected locking aperture provided in the support arm.

14. A seat according to claim 13 wherein the locking pin is biassed into engagement with the aperture and means are provided for withdrawing the locking pin from the aperture against the bias.

15. A seat according to claim 11 wherein guide pins are provided projecting from the squab of the child seat, the guide pins being received in elongated apertures provided in the support arms in order to guide movement of the squab of the child seat relative to the support arms.

16. A seat according to claim 11 wherein the squab of the child seat is pivotally connected to the support arm and is pivotally moved relative to the support arm against a spring bias.

17. A seat according to claim 1 wherein the child seat back includes an element which is pivotally connected to the support arms.

18. A seat according to claim 1 wherein means are provided to retain the child seat in a selected one of a plurality of possible positions relative to the adult seat.

19. A seat according to claim 18 wherein the retaining means comprise a two-bar linkage inter-connecting the back and the squab of the child seat, part of the linkage engaging the back of the adult seat in order to "prop" the child seat in said reclined position.

20. A seat according to claim 19 wherein the retaining means further comprise a locking pin mounted on one bar of the linkage, the pin being adapted to engage one of a plurality of apertures provided at different settings in the back of the child seat.

21. A seat according to claim 1 wherein the back of the child seat is formed by a portion of the back of the adult seat corresponding to the recess.

* * * * *